US009383388B2

(12) United States Patent
Proksch et al.

(10) Patent No.: US 9,383,388 B2
(45) Date of Patent: Jul. 5, 2016

(54) AUTOMATED ATOMIC FORCE MICROSCOPE AND THE OPERATION THEREOF

(71) Applicant: Oxford Instruments Asylum Research, Inc., Goleta, CA (US)

(72) Inventors: Roger Proksch, Santa Barbara, CA (US); Roger C. Callahan, Goleta, CA (US); Frank Stetter, Garching (DE); Ted Limpoco, Goleta, CA (US); Sophia Hohlbach, Santa Barbara, CA (US); Jason Bemis, Santa Barbara, CA (US); Jason Cleveland, Ventura, CA (US)

(73) Assignee: Oxford Instruments Asylum Research, Inc, Goleta, CA (US)

(\*) Notice: Subject to any disclaimer, the term of this patent is extended or adjusted under 35 U.S.C. 154(b) by 0 days.

(21) Appl. No.: 14/692,270

(22) Filed: Apr. 21, 2015

(65) Prior Publication Data

US 2015/0301080 A1    Oct. 22, 2015

Related U.S. Application Data

(60) Provisional application No. 61/995,847, filed on Apr. 21, 2014.

(51) Int. Cl.
*G01Q 60/24* (2010.01)
*G01Q 70/08* (2010.01)
*G01Q 40/00* (2010.01)
*G01Q 60/32* (2010.01)
*G01Q 10/06* (2010.01)

(52) U.S. Cl.
CPC .............. *G01Q 60/24* (2013.01); *G01Q 40/00* (2013.01); *G01Q 60/32* (2013.01); *G01Q 70/08* (2013.01); *G01Q 10/065* (2013.01)

(58) Field of Classification Search
USPC ......................................... 850/5, 6, 7, 21, 33
See application file for complete search history.

(56) References Cited

U.S. PATENT DOCUMENTS

| | | |
|---|---|---|
| 2,964,272 A | 12/1960 | Olson |
| 3,701,499 A | 10/1972 | Schubert |
| 3,807,678 A | 4/1974 | Karnopp et al. |
| 4,080,636 A | 3/1978 | Ravizza |
| 4,083,433 A | 4/1978 | Geohegan, Jr. et al. |
| 4,122,303 A | 10/1978 | Chaplin et al. |
| 4,153,815 A | 5/1979 | Chaplin et al. |

(Continued)

OTHER PUBLICATIONS

T. Drobek, R. W. Stark, and W. M. Heckl, Physical Review B [Condensed Matter and Materials Physics] 64, 045401/1-5 (2001).
F. Krause, F. Kaisinger, H. Starke, G. Persch, and U. Hartmann, Thin Solid Films 264, 141-7 (1995).
Krotil, H. et al. Surface and Interface Analysis,1999, pp. 336-340.
Marti, 0. et al., Review of Scientific Instruments, Jun. 1988.
Rosa, A., et al., Meas. Sci. Technol. 8 (1997) pp. 1-6.

(Continued)

*Primary Examiner* — Nicole Ippolito
*Assistant Examiner* — Hanway Chang
(74) *Attorney, Agent, or Firm* — Law Office of Scott C Harris, Inc

(57) ABSTRACT

Improvements for rapidly calibrating and automatically operating a scanning probe microscope are disclosed. A central component of the SPM is the force transducer, typically a consumable cantilever element. By automatically calibrating transducer characteristics along with other instrumental parameters, scanning parameters can be rapidly and easily optimized, resulting in high-throughput, repeatable and accurate measurements. In contrast to dynamic optimization schemes, this can be accomplished before the surface is contacted, avoiding tip or sample damage from the beginning of the measurement process.

18 Claims, 7 Drawing Sheets

(56) References Cited

U.S. PATENT DOCUMENTS

| | | |
|---|---|---|
| 4,343,993 A | 8/1982 | Binnig et al. |
| 4,417,098 A | 11/1983 | Chaplin et al. |
| 4,473,906 A | 9/1984 | Warnaka et al. |
| 4,477,505 A | 10/1984 | Warnaka |
| 4,489,441 A | 12/1984 | Chaplin |
| 4,490,841 A | 12/1984 | Chaplin et al. |
| 4,527,282 A | 7/1985 | Chaplin et al. |
| 4,562,589 A | 12/1985 | Warnaka et al. |
| 4,566,118 A | 1/1986 | Chaplin et al. |
| 4,600,863 A | 7/1986 | Chaplin et al. |
| 4,615,504 A | 10/1986 | Sandercock |
| 4,626,730 A | 12/1986 | Hubbard, Jr. |
| 4,665,549 A | 5/1987 | Eriksson et al. |
| 4,677,676 A | 6/1987 | Eriksson |
| 4,677,677 A | 6/1987 | Eriksson |
| 4,724,318 A | 2/1988 | Bennig |
| 4,736,431 A | 4/1988 | Allie et al. |
| 4,742,998 A | 5/1988 | Schubert |
| 4,750,721 A | 6/1988 | Sasada |
| 4,757,980 A | 7/1988 | Schubert |
| 4,796,873 A | 1/1989 | Schubert |
| 4,811,309 A | 3/1989 | Eriksson et al. |
| 4,815,139 A | 3/1989 | Eriksson et al. |
| 4,821,205 A | 4/1989 | Schutten et al. |
| 4,837,834 A | 6/1989 | Allie |
| 4,838,392 A | 6/1989 | Miller et al. |
| 4,862,506 A | 8/1989 | Landgarten et al. |
| 4,878,188 A | 10/1989 | Ziegler, Jr. |
| 4,887,699 A | 12/1989 | Ivers et al. |
| 4,898,264 A | 2/1990 | Miller |
| 4,903,247 A | 2/1990 | Van Gerwen et al. |
| 4,903,249 A | 2/1990 | Hoops et al. |
| 4,907,680 A | 3/1990 | Wolfe et al. |
| 4,921,272 A | 5/1990 | Ivers |
| 4,936,425 A | 6/1990 | Boone et al. |
| 4,947,435 A | 8/1990 | Taylor |
| 4,953,089 A | 8/1990 | Wolfe |
| 4,977,600 A | 12/1990 | Ziegler |
| 4,987,598 A | 1/1991 | Eriksson |
| 4,989,684 A | 2/1991 | Conaway |
| 4,993,523 A | 2/1991 | Schwemmer et al. |
| 5,000,415 A | 3/1991 | Sandercock |
| 5,004,079 A | 4/1991 | Ivers et al. |
| 5,052,529 A | 10/1991 | Sutcliffe et al. |
| RE33,937 E | 5/1992 | Schubert |
| 5,109,939 A | 5/1992 | Conaway et al. |
| 5,174,552 A | 12/1992 | Hodgson et al. |
| 5,178,357 A | 1/1993 | Platus |
| 5,214,342 A | 5/1993 | Yang |
| 5,253,853 A | 10/1993 | Conaway et al. |
| 5,255,764 A | 10/1993 | Kurabayashi et al. |
| 5,299,184 A | 3/1994 | Yamano et al. |
| 5,310,157 A | 5/1994 | Platus |
| 5,315,203 A | 5/1994 | Bicos |
| 5,329,122 A | 7/1994 | Sakai et al. |
| 5,370,352 A | 12/1994 | Platus |
| 5,371,727 A | 12/1994 | Shido et al. |
| 5,374,025 A | 12/1994 | Whelpley et al. |
| 5,378,974 A | 1/1995 | Griffin |
| 5,390,121 A | 2/1995 | Wolfe |
| 5,390,892 A | 2/1995 | Platus |
| 5,426,631 A | 6/1995 | Miyazaki et al. |
| 5,444,244 A | 8/1995 | Kirk et al. |
| 5,477,732 A | 12/1995 | Yasue et al. |
| 5,479,386 A | 12/1995 | Takeshita et al. |
| 5,483,822 A | 1/1996 | Albrecht et al. |
| 5,485,451 A | 1/1996 | Yamano et al. |
| 5,503,010 A | 4/1996 | Yamanaka |
| 5,519,212 A | 5/1996 | Elings et al. |
| 5,526,334 A | 6/1996 | Yamano et al. |
| 5,646,339 A | 7/1997 | Bayer et al. |
| 5,660,255 A | 8/1997 | Schubert et al. |
| 5,680,387 A | 10/1997 | Yamano et al. |
| 5,714,831 A | 2/1998 | Walker et al. |
| 5,729,015 A | 3/1998 | Tong |
| 5,742,377 A | 4/1998 | Minne et al. |
| 5,751,684 A | 5/1998 | Takeda et al. |
| 5,763,768 A | 6/1998 | Henderson et al. |
| 5,786,654 A | 7/1998 | Yoshida et al. |
| 5,804,708 A | 9/1998 | Yamanaka et al. |
| 5,805,541 A | 9/1998 | Takeda et al. |
| 5,811,821 A | 9/1998 | Alexander et al. |
| 5,826,864 A | 10/1998 | Barger |
| 5,831,961 A | 11/1998 | Sakai et al. |
| 5,866,805 A | 2/1999 | Han et al. |
| 5,877,412 A | 3/1999 | Muramatsu et al. |
| 5,883,705 A | 3/1999 | Minne et al. |
| 5,924,845 A | 7/1999 | Bagley et al. |
| 5,973,440 A | 10/1999 | Nitzsche et al. |
| 5,975,508 A | 11/1999 | Beard |
| 5,994,820 A | 11/1999 | Kleindiek |
| 6,006,593 A | 12/1999 | Yamanaka |
| RE36,488 E | 1/2000 | Elings |
| 6,051,833 A | 4/2000 | Yasutake |
| 6,075,585 A | 6/2000 | Minne et al. |
| 6,079,255 A | 6/2000 | Binnig et al. |
| 6,141,188 A | 10/2000 | Bauck et al. |
| 6,163,429 A | 12/2000 | Tousain et al. |
| 6,193,206 B1 | 2/2001 | Yasuda et al. |
| 6,209,841 B1 | 4/2001 | Houghton, Jr. et al. |
| 6,215,121 B1 | 4/2001 | Fujihira et al. |
| 6,246,054 B1 | 6/2001 | Toda et al. |
| 6,249,000 B1 | 6/2001 | Muramatsu et al. |
| 6,257,053 B1 | 7/2001 | Tomita et al. |
| 6,298,715 B1 | 10/2001 | Thomson et al. |
| 6,304,409 B1 | 10/2001 | Allsup |
| 6,310,746 B1 | 10/2001 | Hawwa et al. |
| 6,323,483 B1 | 11/2001 | Cleveland et al. |
| 6,349,591 B1 | 2/2002 | Fretigny et al. |
| 6,354,576 B1 | 3/2002 | Jacobs et al. |
| 6,378,672 B1 | 4/2002 | Wakui |
| 6,394,407 B1 | 5/2002 | Ryaboy |
| 6,438,461 B1 | 8/2002 | Desailly et al. |
| 6,452,170 B1 | 9/2002 | Zypman et al. |
| 6,459,088 B1 | 10/2002 | Yasuda et al. |
| 6,465,782 B1 | 10/2002 | Kendall |
| 6,511,035 B1 | 1/2003 | Teel et al. |
| 6,516,130 B1 | 2/2003 | Jang |
| 6,530,268 B2 | 3/2003 | Massie |
| 6,552,339 B1 | 4/2003 | Gupta et al. |
| 6,568,666 B2 | 5/2003 | Houghton, Jr. |
| 6,570,298 B2 | 5/2003 | Yasuda |
| 6,578,410 B1 | 6/2003 | Israelachvili |
| 6,593,997 B1 | 7/2003 | Watson et al. |
| 6,601,524 B2 | 8/2003 | Janata et al. |
| 6,603,531 B1 | 8/2003 | Binnard |
| 6,608,959 B2 | 8/2003 | Jang et al. |
| 6,614,601 B2 | 9/2003 | Dallakian |
| 6,617,761 B2 | 9/2003 | Ando et al. |
| 6,619,611 B2 | 9/2003 | Ryaboy et al. |
| 6,626,411 B2 | 9/2003 | Houghton, Jr. et al. |
| 6,655,840 B2 | 12/2003 | Nunnally |
| 6,674,600 B1 | 1/2004 | Codilian et al. |
| 6,681,152 B1 | 1/2004 | Remington et al. |
| 6,724,466 B2 | 4/2004 | Ono et al. |
| 6,757,053 B1 | 6/2004 | Hazelton et al. |
| 6,767,696 B2 | 7/2004 | Howald et al. |
| 6,791,058 B2 | 9/2004 | Heitel et al. |
| 6,809,306 B2 | 10/2004 | Ando et al. |
| 6,810,720 B2 | 11/2004 | Adderton et al. |
| 6,861,649 B2 | 3/2005 | Massie |
| 6,874,748 B2 | 4/2005 | Hanagan |
| 6,880,386 B1 | 4/2005 | Krotil et al. |
| 6,885,430 B2 | 4/2005 | Tanaka et al. |
| 6,958,808 B2 | 10/2005 | Tanaka et al. |
| 7,129,486 B2 | 10/2006 | Spizig et al. |

OTHER PUBLICATIONS

T. Drobek, R. W. Stark, and W. M. Heckl, Physical Review B 6404 (2001).
R. W. Stark, G. Schiffer, M. Stark, R. Guckenberger, and A. Stemmer, Physical Review B 69 (2004).

AUTOMATED ATOMIC FORCE MICROSCOPE AND THE OPERATION THEREOF

This application claims priority from provisional application No. 61/995,847, filed Apr. 21, 2014, the entire contents of which are herewith incorporated by reference.

BACKGROUND OF THE INVENTION

For the sake of convenience, the current description focuses on systems and techniques that may be realized in a particular embodiment of cantilever-based instruments, the atomic force microscope (AFM). Cantilever-based instruments include such instruments as AFMs, scanning probe microscopes, molecular force probe instruments (1D or 3D), high-resolution profilometers (including mechanical stylus profilometers), surface modification instruments, chemical or biological sensing probes, and micro-actuated devices. The systems and techniques described herein may be realized in such other cantilever-based instruments as well as AFMs.

An AFM as shown in FIG. 1 is a device used to produce images of the topography of the sample (and/or other sample characteristics) based on information obtained from scanning (e.g., rastering) a sharp tip on the end of a cantilever 1010 attached to a chip 1030 relative to the sample surface. Topographical and/or other features of the sample are detected by detecting changes in deflection and/or oscillation 1040 characteristics of the cantilever (e.g., by detecting small changes in deflection, phase, frequency, etc., and using feedback 1060 to return the system to the reference state). By scanning the probe relative to the sample surface 1090, a "map" of the sample topography or other sample characteristics may be obtained.

Changes in deflection or oscillation of the cantilever are typically detected by an optical lever arrangement whereby a light beam is directed onto the back of the cantilever opposite the tip 1010. The beam reflected from the cantilever illuminates a spot on a position sensitive detector (PSD 1020). As the deflection or oscillation of the cantilever changes, the position of the reflected spot on the PSD changes, causing a change in the output from the PSD. In addition changes in the deflection or oscillation of the cantilever are typically made to trigger a change in the vertical position of the cantilever base relative to the surface of the sample (referred to herein as a change in the Z position, where Z is generally orthogonal to the XY plane defined by the sample surface), in order to maintain the deflection or oscillation at a constant pre-set value 1050. This feedback 1060 is typically used to generate an AFM image 1110.

Actuators 1080 are commonly used in AFMs, for example to raster the cantilever or to change the position of the cantilever base relative to the surface of the sample. The purpose of actuators is to provide relative movement between different components of the AFM; for example, between the probe 1010 and the sample 1040. For different purposes and different results, it may be useful to actuate the sample, the cantilever or the tip of the cantilever, or some combination of these elements. Sensors are also commonly used in AFMs. They are used to detect movement, position, or other attributes of various components of the AFM, including movement created by actuators.

For the purposes of the specification, unless otherwise indicated, the term "actuator" 1080 refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators, and the term "sensor" or "position sensor" refers to a device that converts a physical parameter such as displacement, velocity or acceleration into one or more signals such as an electrical signal, including capacitive sensors, inductive sensors (including eddy current sensors), differential transformers (such as described in co-pending applications US20020175677A1 and US20040075428A1, Linear Variable Differential Transformers for High Precision Position Measurements, and US20040056653A1, Linear Variable Differential Transformer with Digital Electronics, which are hereby incorporated by reference in their entirety), variable reluctance, optical interferometry, optical deflection detectors (including those referred to above as a PSD and those described in co-pending applications US20030209060A1 and US20040079142A1, Apparatus and Method for Isolating and Measuring Movement in Metrology Apparatus, which are hereby incorporated by reference in their entirety), strain gages, piezo sensors, magnetostrictive and electrostrictive sensors.

AFMs can be operated in a number of different sample characterization modes, including contact mode where the tip of the cantilever is in constant contact with the surface of the sample, and AC modes where the tip makes no contact or only intermittent contact with the sample surface.

In both the contact and ac 1080 sample characterization modes, the interaction between the tip of the cantilever and the sample induces a discernable effect on a cantilever-based operational parameter, such as the cantilever deflection, the cantilever oscillation amplitude or the frequency of the cantilever oscillation, the phase of the cantilever oscillation relative the signal driving the oscillation, all of which are detectable by a sensor. AFMs use the resultant sensor-generated signal as a feedback control signal for the Z actuator to maintain constant a designated cantilever-based operational parameter.

To get the best resolution measurements, one wants the tip of the cantilever to exert only a low force on the sample. In biology, for example, one often deals with samples that are so soft that forces above 10 pN can modify or damage the sample. This also holds true for high resolution measurements on hard samples such as inorganic crystals, since higher forces have the effect of pushing the tip into the sample, increasing the interaction area and thus lowering the resolution. For a given deflection of the probe, the force increases with the spring constant (k) of the cantilever. When operating in air in AC modes where the tip makes only intermittent contact with the sample surface, spring constants below 30 N/m are desirable. For general operation in fluid, very small spring constants (less then about 1.0 N/m) are desirable.

At the same time it is often useful in biology to measure the stiffness of a sample, to distinguish DNA from a salt crystal for example. Images of the topography of a sample do not tell us much about stiffness.

With contact AFM it has been common to measure the interaction forces between the cantilever and the sample with Hooke's Law, a relationship describing the behavior of springs, where the force exerted by the spring, F, is equal to a constant characterizing the spring, k, times a change in position of the spring, x: $F=kx$. In the case of AFMs, the spring is the cantilever, the constant is the spring constant of the cantilever, and the change in position is a change in the deflection of the cantilever as measured by the PSD.

Early spring constant calculations were based on order-of-magnitude knowledge. One of the first attempts to produce a more accurate determination has come to be known as the Cleveland method, after Jason Cleveland, then a graduate student at the University of California, Santa Barbara. Cleveland, J. P., et al., *A nondestructive method for determining the spring constant of cantilevers for scanning force microscopy*, Rev. Scientific Instruments 64, 403, 1993. The Cleveland method estimates the spring constant by measuring the change in resonant frequency of the cantilever after attaching tungsten spheres of known mass to the end of the cantilever. Cleveland claims that this method should be applicable to most cantilevers used in calculating force.

A few years after publication of the Cleveland method, a simpler method for estimating the spring constant noninvasively was published which has also come to be known under the name of the lead author, John Sader. Sader, John E., et al., *Calibration of rectangular atomic force microscope cantilevers, Rev. Scientific Instruments* 70, 3967, 1999. The theory starts with the well-known relationship between stiffness, mass, and resonance frequency ($k=m\omega^2$) which provides an intuitive way to calibrate the stiffness of a cantilever in air by simply measuring its width, length, height and resonance frequency. However, the large error in the thickness of the cantilever, which may also not be uniform, leads to a poor estimate of the cantilever mass. Whereas modeling the inertial loading of the cantilever (the cantilever mass) is inaccurate, the viscous loading of the cantilever can be reliably modeled in fluids such as air. In ambient conditions, the viscous loading is dominated by hydrodynamic drag of the surrounding air. This hydrodynamic drag depends on the density and viscosity of air, and the plan-view geometry of the cantilever. Because the thickness of the cantilever plays no role in the hydrodynamic drag, the viscous loading can be very accurately modeled for any given cantilever shape and used to calibrate cantilevers. In summary, the Sader method provides a straightforward formula for estimating the spring constant of a rectangular cantilever which requires the resonant frequency and quality factor of the fundamental mode of the cantilever, as well as its plan view dimensions. The method also assumes that the quality factor is equal to or greater than 1, which is typically true if the measurement is made in air.

The spring constant of the cantilever provides the information necessary to calculate the force exerted by the cantilever. In an AFM system where the sample is moved relative to the cantilever, the additionally required information is the change in the deflection signal of the cantilever (as measured by the PSD in volts), as a function of the distance the actuator moves the sample (which is a conversion into distance units of the voltage applied to the actuator). The estimate of this relationship is often referred to as the calibrated sensitivity of the optical lever of the AFM, or just optical lever sensitivity ("OLS").

Where a relatively rigid sample was available, early estimates of the sensitivity of the optical lever of an AFM were typically made by pushing the tip of the cantilever into the sample and using the voltage response of the PSD (which is a measure of the change in the deflection of the cantilever, but since it is in volts not a measure that is directly usable for our purposes) taken together with the distance the actuator moves the sample to estimate the factor that can be applied to convert other voltage measurements of deflection into distance. This method has some disadvantages: (1) where the sample is soft, as is typically the case with biological samples, the response to pushing the tip into the sample will be nonlinear and therefore not useful for estimating the voltage response of the PSD or the distance the actuator moves the sample; (2) where the sample is a biological sample, it may contaminate the tip when the tip is pushed into the sample and here too yield a nonlinear response; and (3) it is altogether too easy to damage the tip of a cantilever when pushing it into a sample.

An xy graph can be used to show typical sample displacement on the x-axis (the more the sample is raised the further out we are on the x-axis) and tip displacement on the y-axis (the more the tip is raised the further out on the y-axis) when the sample is raised toward the tip during the process of making an estimate of the sensitivity of the optical lever of an AFM. At point A on the graph the sample and the tip are sufficiently far apart that neither exerts a force on the other. When the sample is raised from point A to point B however the distance from the tip is sufficiently small that the attractive Van der Waals force is operative and the tip is pulled toward the surface. At point C the Van der Waals force has overcome the spring tension of the cantilever and the tip has dropped to the surface of the sample. If we continue to raise the sample further at this point, the tip will remain in contact with the rising sample following it upward along the path designated by points C, E and F. If the sample is retracted from point F the tip will again follow—even beyond point C where the tip had dropped to the surface of the sample when the sample was being raised (the extent the tip follows the sample will depend in part on the presence of capillary forces, a normal condition except when the AFM is operating in a vacuum or in liquids). At some point however the tip will break free from the sample and return to the null position line. The point at which the tip breaks free is point G.

The distance on the y-axis from point G to point F is an estimate of the change in the deflection of the cantilever when the tip of the cantilever is pushed into the sample, just as the distance on the x-axis between those points is an estimate of the distance the actuator moves the sample. The relation between these estimates gives us the factor that can be applied to convert other voltage measurements of deflection into distance. As noted above this factor is usually referred to as optical lever sensitivity, or OLS. In order to distinguish it from a similar factor to be discussed below we will also call it the dc OLS.

Recently a group working a Trinity College, Dublin and Asylum Research in California, as well as John Sader, have developed a method which provides a straightforward formula for estimating OLS noninvasively. M. J. Higgins, et al., *Noninvasive determination of optical lever sensitivity in atomic force microscopy, Rev. Scientific Instruments* 77, 013701, 2006. The method requires the thermal noise spectrum of the cantilever to be measured (on an AFM) and the fundamental mode of the spectrum to be fitted to the power response function of the simple harmonic oscillator. The equipartition theorem is then applied to this result and after simplification the result is a straightforward formula for estimating inverse dc OLS which requires the spring constant of the cantilever, as well as its resonant frequency, quality factor and dc power response.

We have discussed above the dc OLS factor estimated by raising and retracting the sample relative to the tip of the cantilever and comparing the deflection of the cantilever as measured on the y-axis with the distance the actuator moves the sample as measured on the x-axis. The dc OLS factor pertains to operation of an AFM in the contact mode. In ac modes a different OLS factor may be estimated. In ac modes the cantilever is initially oscillating at its free amplitude unaffected by the sample. In an AFM system where the sample is moved relative to the cantilever, as the sample is raised to the oscillation path however the tip of the oscillating cantilever contacts the sample and the amplitude of the vibration decreases. Initially for each nanometer the sample is raised the amplitude of the vibration decreases by a nanometer as well. When the sample begins to retract the amplitude increases until the tip is free of the sample surface and the amplitude of the cantilever oscillation levels off at its free amplitude. The ac OLS factor is estimated by comparing the cantilever deflection amplitude as measured on the y-axis for one complete extension and retraction of the sample actuator with the distance the actuator moves the sample as measured on the x-axis. As with the dc OLS factor, cantilever deflection amplitude is measured by the PSD in volts and the distance the actuator moves the sample is a conversion into distance units of the voltage applied to the actuator.

As with the spring constant and dc OLS, a noninvasive method for measuring the ac OLS factor has also been developed. R. Proksch, et al., *Finite optical spot size and position corrections in thermal spring constant calibration*, Nanotechnology 18, 1344, 2004. The authors make the point, as had others before them, that the value of OLS will be different depending on whether the cantilever is "deflected by a localized and static force at the end [that is the end where the tip is located], as in the case of force measurements or AFM imaging, or whether it vibrates freely . . . ." They derive a factor for relating the two OLSs given by $\kappa = \text{InvOLS}_{free}/\text{InvOLS}_{end}$. It will be noted that the authors' $\text{invOLS}_{free}$ measurement is essentially the ac OLS measurement discussed above and the $\text{InvOLS}_{end}$ measurement is essentially the dc OLS measurement discussed above. In their discussion of the derivation of the factor for relating the two OLSs the authors make the point that the factor is dependent on the location of the laser spot on the cantilever.

SUMMARY OF THE INVENTION

The inventors recognize that a central component of the SPM is the force transducer, typically a consumable cantilever element. By automatically calibrating transducer characteristics along with other instrumental parameters, scanning parameters can be rapidly and easily optimized, resulting in high-throughput, repeatable and accurate measurements. In contrast to dynamic optimization schemes, this can be accomplished before the surface is contacted, avoiding tip or sample damage from the beginning of the measurement process.

DESCRIPTION OF THE PREFERRED EMBODIMENTS

Among the most significant challenges in setting up an AFM in ac mode is optimizing the scanning parameters such that the tip of the cantilever and the sample are not damaged or fouled and the fidelity of the data is not compromised. In particular the inventors have been concerned with integral feedback gains and the scanning rate. When the integral gains are set too low, the cantilever does a poor job of tracking the sample surface and will cause damage or return a low fidelity image of the surface. If they are set too high, the cantilever actuator can become unstable and oscillate which can cause severe tip and sample surface damage as well as returning a low fidelity image of the surface.

Some users skilled in the art start their setup of an AFM in ac mode with nominal parameters and adjust those parameters while scanning using common sense. This method can result in damage to the tip of the cantilever or the sample because the starting parameters are not optimal, and the parameters may only be optimized by the user after damage has be imparted on the cantilever tip. An alternative method, sometimes called the dynamic method, simply plunges in by engaging the tip on the sample and varying the feedback gains to "optimize" image fidelity and hopefully reduce tip-sample damage. Whether this approach gives better results than the common sense approach is certainly questionable.

It is therefore desirable to have a reliable method for determining optimized imaging parameters for AFM in ac mode before the tip touches the sample. However this situation presents a particularly difficult problem because the tip-sample interaction is highly nonlinear and therefore not particularly amenable to simple analysis or prediction. Nevertheless we have extracted some simple relationships for optimizing a few imaging parameters. We begin with the optimization of integral gain.

Figure 2:
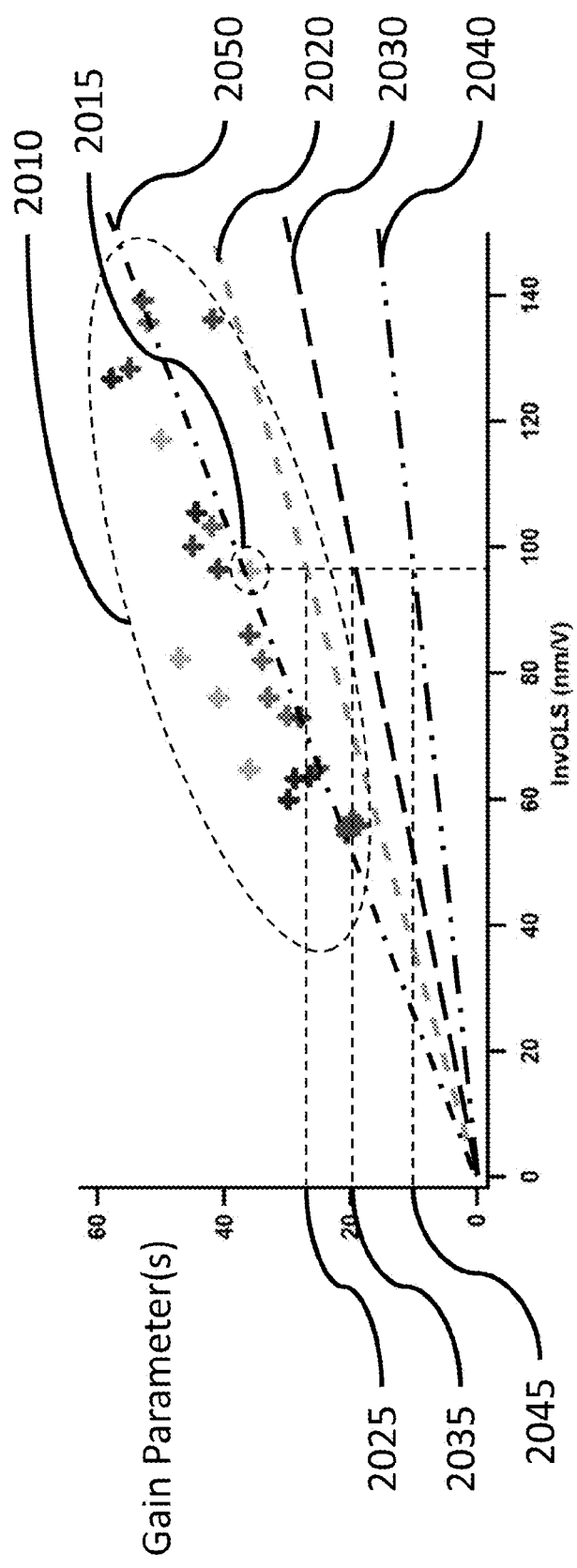
FIG. 2: A plot of maximum integral gain versus sensitivity (InvOLS).

Across many experiments we have derived a relatively simple empirical relationship between the ac optical lever sensitivity, "OLS" and integral gain which allows an AFM user to set integral gain in accordance with their tolerance for the risk of instability in the feedback loop. FIG. 2 shows the relationship, a relationship between the inverse of ac OLS (which we call InvOLS) on the x-axis and integral gain on the y-axis. As can be seen, the line indicating the relationship has a positive slope, indicating that as InvOLS increases so does integral gain.

The InvOLS/integral gain line was derived from two cantilever measurements on a sample of 25 different cantilevers of similar dimensions. The measurements were made on the same ac mode AFM. The initial measurement on each cantilever was the determination of InvOLS with integral gain fixed at a nominal amount. Immediately thereafter the AFM was engaged on a sample and the integral gain increased slowly until the cantilever actuator started to oscillate and became unstable. After completion of the sampling, the InvOLS variables taken at the beginning of each cantilever measurement were regressed on the integral gain variables taken at the point of instability. The positively sloped line FIG. 2 was the result.

The FIG. 2 InvOLS/integral gain line allows the user to choose the level of risk of instability in the feedback loop they wish to accept. After loading a new cantilever in the AFM and measuring InvOLS with that cantilever, the user can then select a high level of risk by setting integral gain at the amount on the FIG. 2 InvOLS/integral gain line corresponding to InvOLS as just measured. Of course the user could instead be more conservative and select a lower level of risk by setting integral gain below the amount on the FIG. 2 InvOLS/integral gain line corresponding to InvOLS, or even be more aggressive and select a risky alternative by setting integral gain above the amount on the FIG. 2 InvOLS/integral gain line corresponding to InvOLS.

To improve the fidelity of the imaging process, it is important to ensure the cantilever is always sampling the topography. A cantilever oscillating at or near its resonance frequency requires some time to react to changes in the tip-sample interaction, such as might take place while imaging a sample. These changes might be topographic or in the tip-sample stiffness for example. This relaxation time is proportional to the quality factor, Q and inversely proportional to the resonance frequency. Thus, low resonant frequency, and/or high Q factor cantilevers relax more slowly than do high resonance frequency, low Q factor levers.

In either case, if a particular measurement is made too rapidly, before the cantilever can relax, a majority of the tip-sample interactions are either made without the tip interacting strongly with the sample (parachuting) or with the lever interacting too strongly with the sample. Either case represents an error in the setpoint amplitude. This error in turn may well lead to a mis-estimation in the tip-sample interactions and to other problems including poor, unstable topographic feedback and poor estimation of surface dimensions and properties. Thus, it is desirable to operate the microscope in a manner that allows the cantilever to relax sufficiently to provide good feedback and reliable surface measurements. One preferred means of accomplishing this is to use the formula below to place a maximum constraint on the scan rate SR, as the cantilever with resonant frequency $f_0$ and quality factor Q samples a number of data points in a single scan line N is given by $$SR \leq \frac{\pi f_0}{2Q \cdot N}.$$

Thus for example, if we had a cantilever with Q=150, $f_0$=70,000 Hz (typical for a lever such as the Olympus AC240) scanning at N=512 points per line, the line scan rate should be $$SR \leq \frac{\pi \cdot 70,000 \text{ Hz}}{2150 \cdot 512} \approx 1.4 \text{ Hz}.$$

Those skilled in the art will recognize that as a reasonable upper limit for the scan speed of that type of cantilever.

The measurement time for a pixel, a single point is $$SR \leq \frac{\pi f_0}{2Q}.$$

Similarly, the acquisition time for an image of N×M pixels is constrained by $$SR \leq \frac{\pi f_0}{2Q \cdot N \cdot M}.$$

The adjustment of the imaging feedback parameters is reliant on knowing the InvOLS of the cantilever. When various cantilevers are loaded into and AFM, the deflection to voltage sensitivity that they exhibit—the voltage is output by the detection means for a given deflection distance—varies from lever to lever. In the case of an optical lever, the sensitivity may vary due to variations in the positioning, focus, size and location of the spot. There may be variations in the smoothness and uniformity of the portion of the cantilever involved in reflecting the optical signal which will affect the sensitivity. Other detection methods such as piezo- or strain-resistive, interferometric and others are also subject to variations from lever to lever.

As discussed previously, measurement of the InvOLS of the cantilever can present additional complexity while also risking damage or fouling of the tip or sample. Prior art methods exist for measuring the cantilever sensitivity (InvOLS) without touching the surface of the sample. In a preferred method of accomplishing this, the thermal (Brownian) motion of the cantilever is measured. This information is then applied to a hydrodynamic function [Sader et al., REVIEW OF SCIENTIFIC INSTRUMENTS 83, 103705 (2012), Green at al. Rev. Sci. Instrum., Vol. 75, No. 6, June 2004, Sader et al. Rev. Sci. Instrum. 70, 3967 (1999)] to estimate both the InvOLS and the spring constant. Note that this can be accomplished on a single or on multiple resonance modes. This includes higher resonance modes that can be used for conventional imaging as well as a variety of other advanced techniques such as stiffness and modulus mapping.

When using a non-contact method to determine the InvOLS, the invention described here may use this parameter to optimize the scanning parameters such as feedback gains, cantilever amplitude, and sampling rate—without first touching a surface. Note that this is fundamentally different from prior art approaches that dynamically adjust gains, amplitudes, and sampling parameters during the scanning process. In those approaches, if the initial parameters are chosen to be too high or too low, the tip and the sample are likely to be irreversibly damaged.

This novel non-contact parameter optimization method can optionally be used in conjunction with dynamic adjustments of some parameters after the initial engagement between the cantilever and the sample has occurred. If for example, the roughness of the sample turns out to be greater over one area than it is over another or than the expected input parameter, the cantilever amplitude and setpoint could be adjusted dynamically to account for this change. Other metrics such as cantilever phase, feedback loop ringing, or differences in the trace and retrace scans can be used to optimize the imaging parameters during the scan. These optimization criteria can be applied and adjusted on a scan-by-scan, line-by-line, or pixel-by-pixel basis. Even though this implies that the original settings were sub-optimal, the initial parameter settings afforded by this method can ensure that when the dynamic optimization is performed, it is accomplished with initial settings that avoid damage or fouling to the tip or sample.

Q-control, preferably digital Q-control as that described in U.S. Pat. No. 8,042,383 can also be used in conjunction with the method. The Q-gain can be adjusted to provide for faster operation of a cantilever (lower Q) or increased sensitivity (higher Q) depending on (i) the user goals or dynamically based on the measured response of the cantilever to the sample being measured.

There are many methods for measuring the spring constant and sensitivity of cantilevers. A recent review of some of these methods is contained in J. E. Sader, Review of Scientific Instruments 83, 103705 (2012) and the references. Some of these methods, such as the so-called "thermal method" (J. L. Hutter and J. Bechhoefer, Rev. Sci. Instrum. 64, 1868 (1993).) require that the sensitivity is also characterized. These methods yield the spring constant as a function of the sensitivity. If this is the case and if the spring constant of the cantilever is known through a separate, independent method, then the sensitivity can be inferred by inverting the first spring constant sensitivity function. If both the methods are non-contact, then the sensitivity can be estimated without requiring that the tip touch the sample. This method of simultaneously estimating the spring constant and sensitivity has been commercially implemented under the trade name "GetReal". In this case, the "Sader method" described in the following paragraph is used to estimate the spring constant and then the "thermal method" is used to estimate the sensitivity.

Sader's original theory described, in the background of the invention section, models the hydrodynamic drag of the cantilever and its frequency dependence for a rectangular cantilever. Since then, Sader proposed a new theory that relies on empirically measuring the frequency dependence of the hydrodynamic drag function for any arbitrary cantilever shape [John E. Sader, Julian A. Sanelli, Brian D. Adamson, Jason P. Monty, Xingzhan Wei et al. "Spring constant calibration of atomic force microscope cantilevers of arbitrary shape" REVIEW OF SCIENTIFIC INSTRUMENTS 83, 103705 (2012)]. Once the hydrodynamic drag function of a cantilever is known, it can be related to the mass of the cantilever by a careful measurement of the Q factor, which is equal to the ratio of the inertial loading over the viscous loading. Therefore, the product of the empirically determined viscous loading (by the AFM manufacturer) and the carefully measured Q factor (measured by the experimenter) provides a precise estimate of the inertial mass loading of the cantilever. With a known mass of the cantilever, the well-known relationship $k=m\omega^2$ can be applied to calculate the stiffness.

Figure 1:
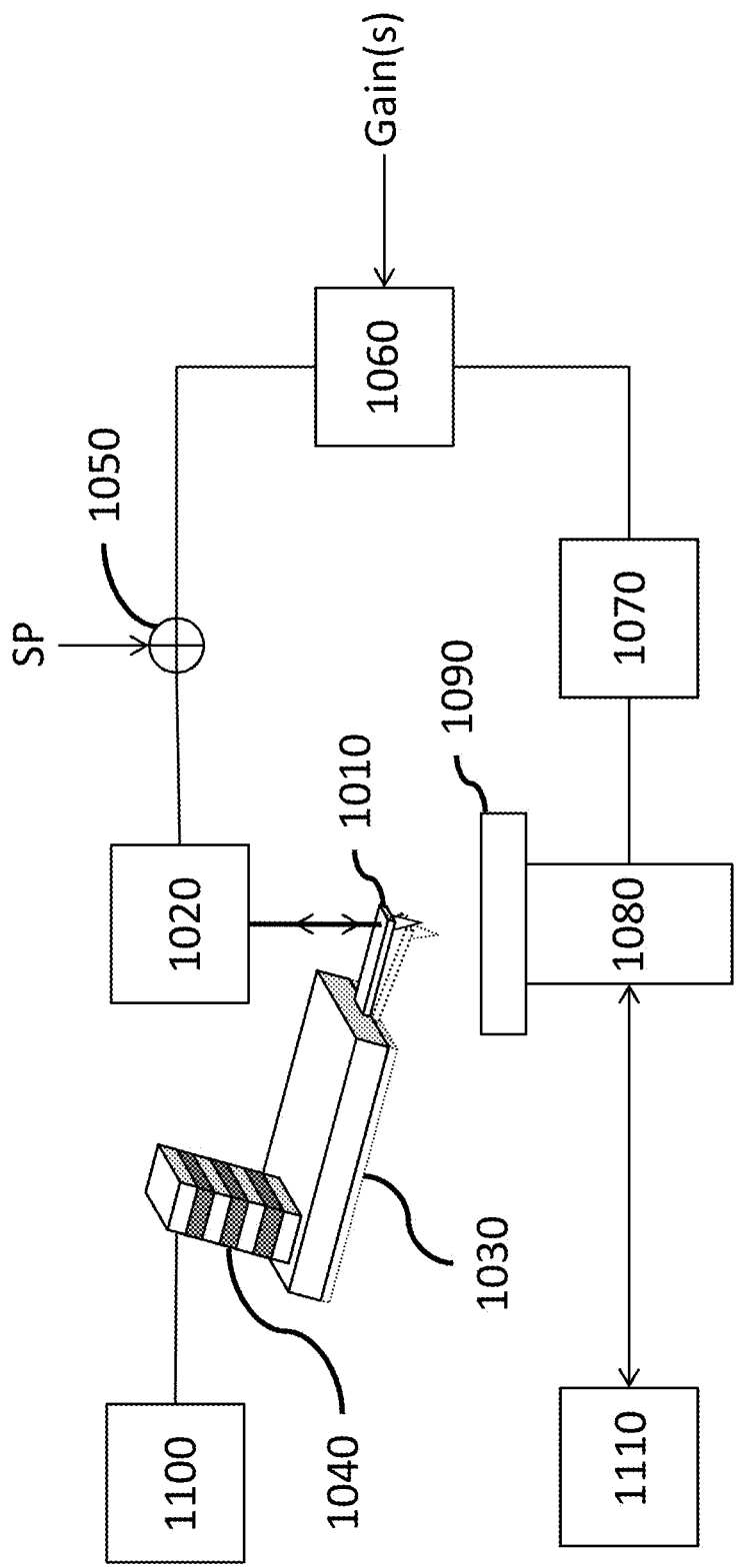
FIG. 1: Prior Art AFM.
Figure 3:
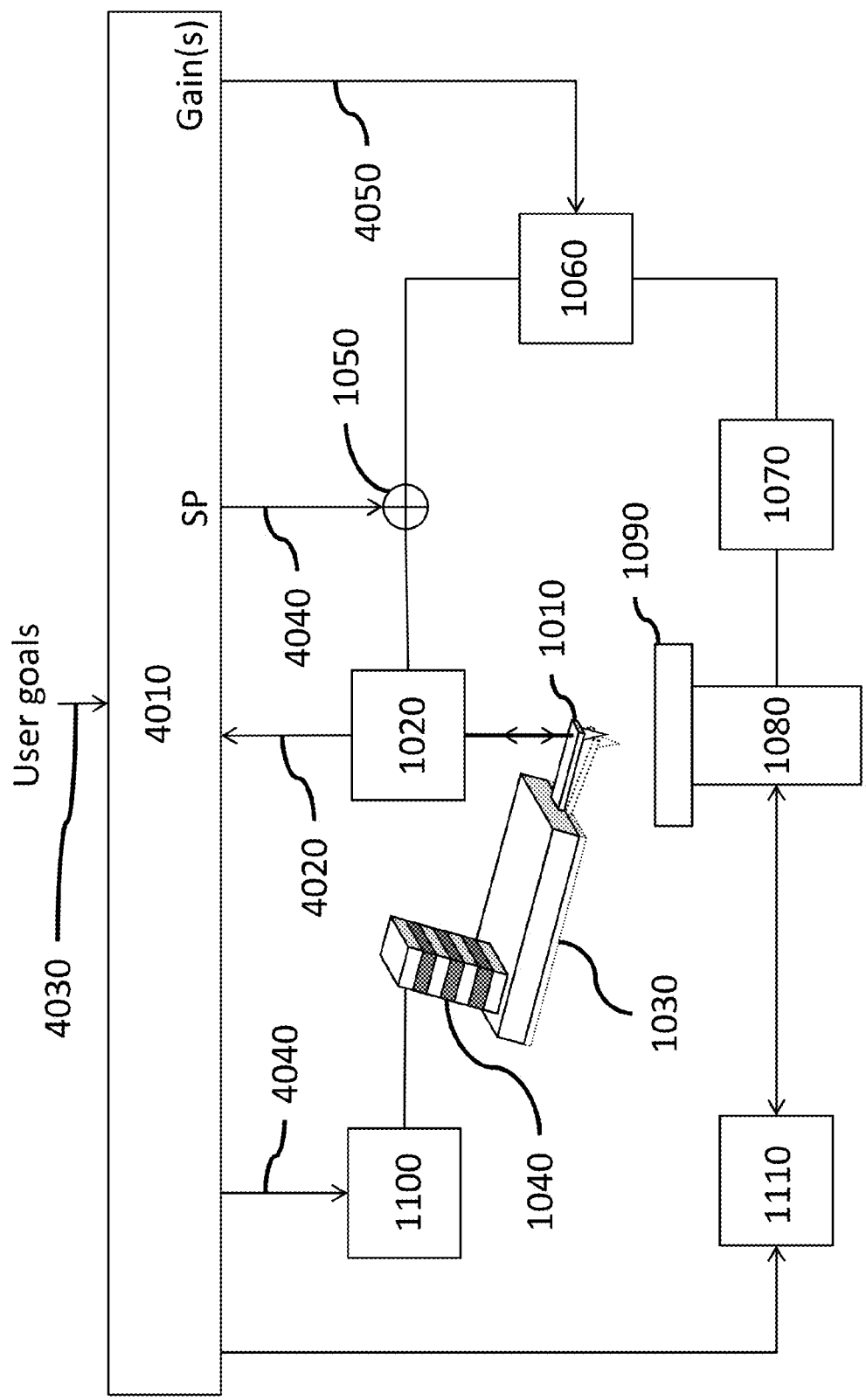
FIG. 3: A schematic of a preferred embodiment.

A preferred implementation of the invention is described in FIG. 3. In this case, the AFM of FIG. 1 is enhanced with analog or digital computation means 4010. Non-contact measurements of the cantilever response 4020 to either Brownian motion or optionally driven 1100 cantilever response is used, in conjunction with optional user defined goals 4030 to estimate optimal imaging and/or measurement settings for the AFM. For example, the setpoint 4040 can be automatically chosen based on the user preferences and response of the cantilever. In addition, the cantilever excitation parameters, such as drive amplitude, frequency and phase can be controlled 4040. The gain(s) controlling various feedback loops can also be automatically optimized 4050. The xy scanning parameters 4060 can also be optimized dependent upon the user-defined goals 4030 and the non-contact measurements 1020.

Figure 4:
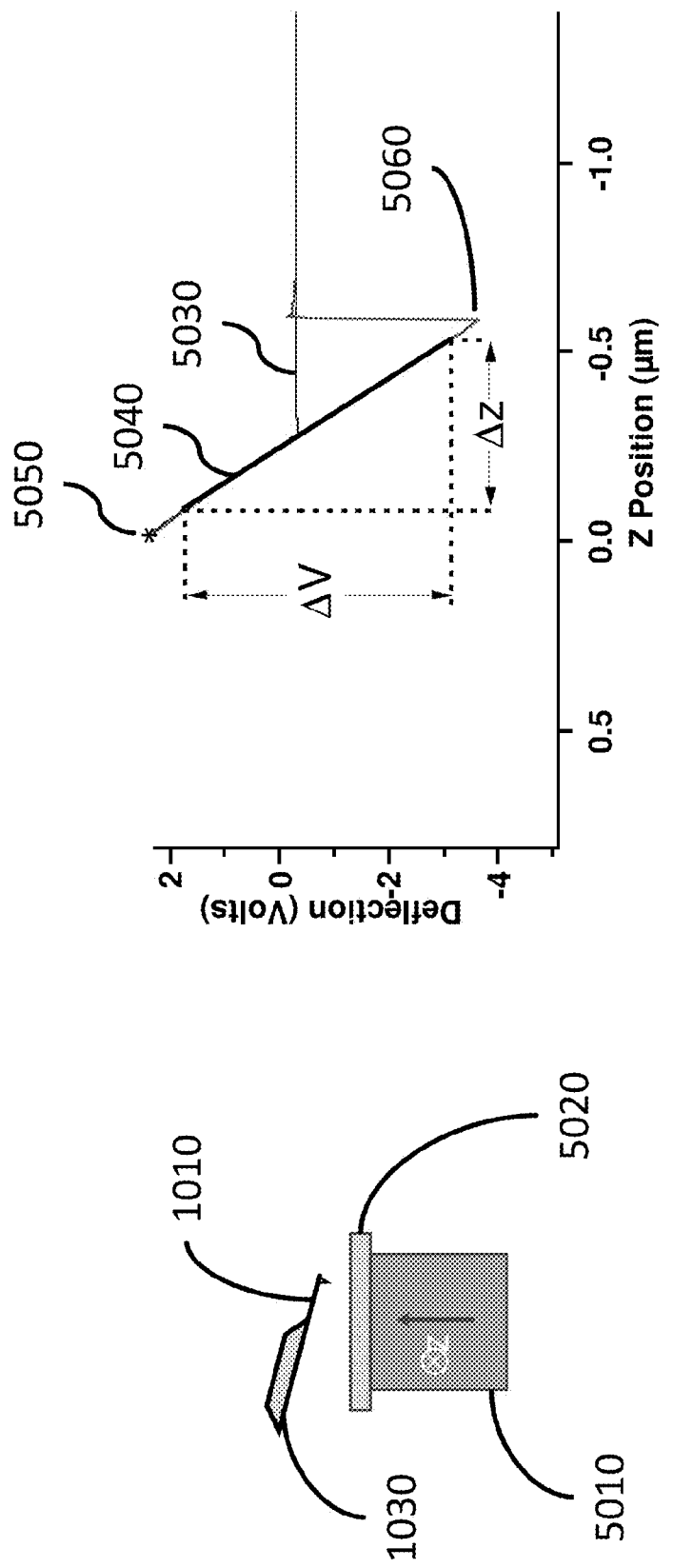
FIG. 4: Using the method to make optimized force curves and force maps
Figure 5:
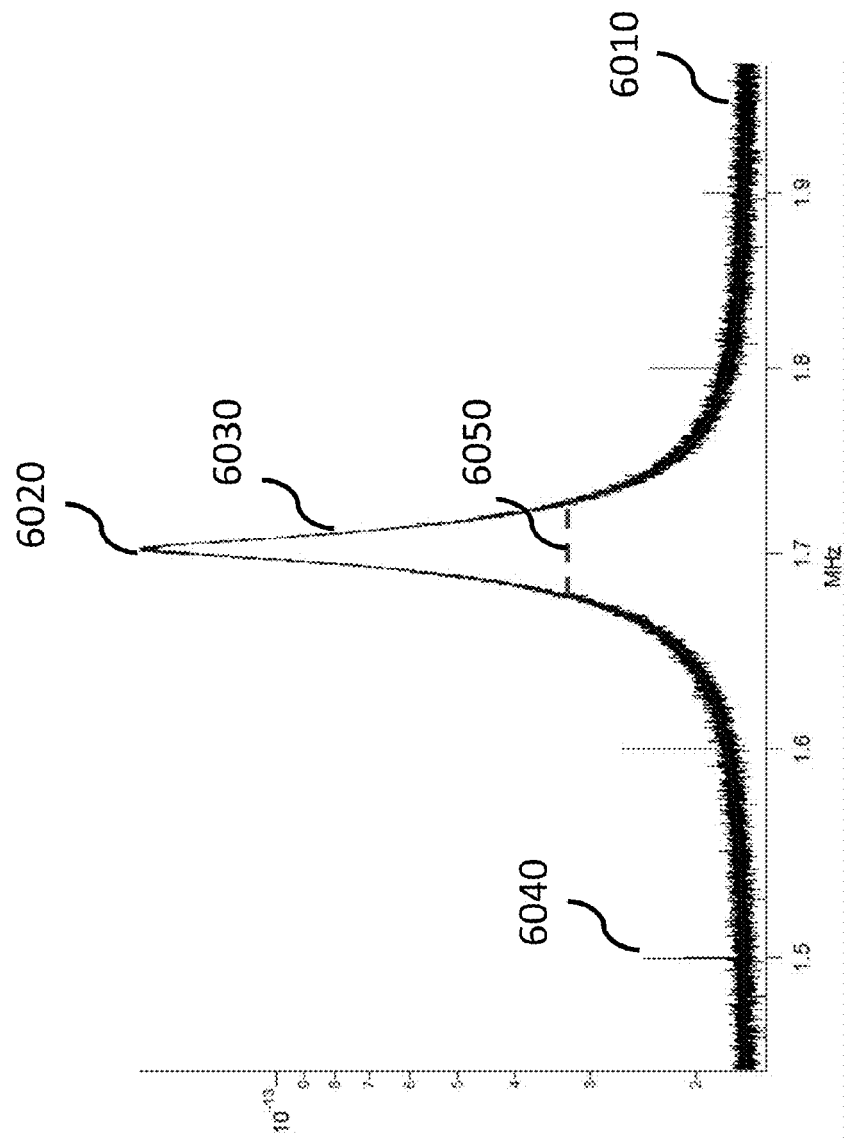
FIG. 5: A plot of a thermal spectrum (Amplitude vs. Frequency) demonstrating model fitting, Q, and spurious noise signals.

This method can be used to automatically configure an AFM to make force curves measurements. A force measurement is shown in FIG. 4. An actuator 5010 that causes relative motion between the base of a cantilever 1030 and a sample 5020 often results in deflection of the cantilever 1010 as the tip of the cantilever interacts with the surface. A typical sequence of events is illustrated by a plot of the cantilever deflection output by the detector 1020 (in volts) versus the base position (typically measured in convenient units of length, often nanometers or micrometers). Initially, the cantilever approaches the surface with small deflection 5030, perhaps resulting from long-range forces between the tip and the sample or the cantilever and the sample. When the tip encounters the strong short ranged repulsive forces, it begins to deflect more significantly 5040. At some point, the point of maximum force 5050, the cantilever-sample motion reverses and the force between the tip and sample begins to decrease. If there are adhesive forces present, there can be a snap-off 5060 and then the measured deflection returns to the initial baseline 5030. If the sample is hard enough to not be significantly indented by the cantilever tip, then the vertical deflection of the cantilever should match the motion of the sample driven by the actuator. In this case, the sensitivity of the position sensor can be estimated from the slope of the repulsive contact line 5040. If the sample is compliant, then the slope of that line (or more often curve) provides information regarding sample mechanical properties including the modulus, plasticity, hardness and many other properties known to one skilled in the art. In practice, since the tip can be damaged with this sort of calibration and because most samples have at least some unknown indentation, it is preferable to estimate the InvOLS in some other, preferably non-contact manner.

Figure 6:
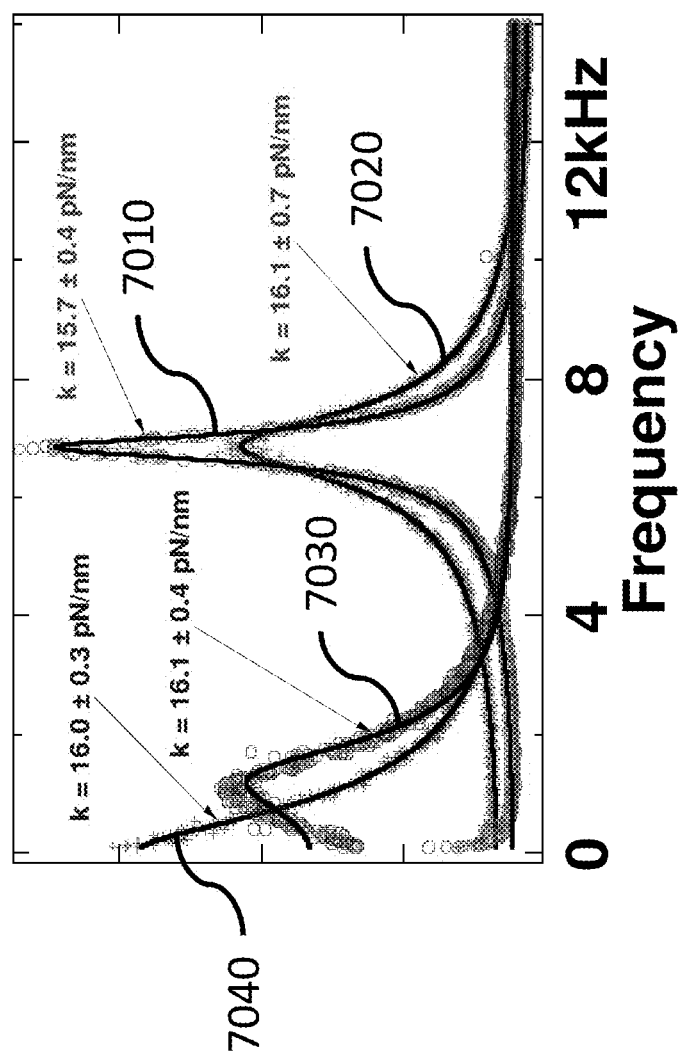
FIG. 6: Extending the method to operation in fluid

Non-contact calibration which utilizes the preferred method of measuring a Brownian or optionally driven cantilever as shown in FIG. 6 can be difficult to automate. The amplitude versus frequency spectrum 6010 of the cantilever is plotted and the resonance frequency is found at a nominal value 6020 based on the cantilever type. Hydrodynamic models are fitted to the resonance peak 6030 and used to calculate the spring constant and subsequently the InvOLS, as described above. Fitting the resonance peak to a hydrodynamic function can be difficult to automate as the measured data can contain multiple driven harmonics or spurious noise peaks 6040 from the environment or the electronics of the instrument. Fitting these features would result in incorrect calibration and failure to calculate the correct scanning parameters. In order to reduce parameter selection errors based on improper automated fitting, the current implementation utilizes the expected frequency range of the cantilever based on input either from the user or from some automated method which identifies the cantilever being used and constrains the fitting range to that of the expected first fundamental. Further, applying strict selection criteria on the resultant measured Q based on the width of the peak 6050 and white noise of the measurement that is to be fitted can be used to reject noise peaks. Peaks that do not fall within the expected Q and white noise parameters of the chosen lever are rejected from the fitting routine. Finally, the user may override this automated implementation and manually fit the models to determine the sensitivity and spring constant of the cantilever.

In addition, since control of the maximum force involves gain parameters (see for example see The Jumping Probe Microscope in U.S. Pat. No. 5,415,027 and its numerous family members as well and its derivatives such as Pulsed Force Microscopy (A Rosa-Zeiser et al., Meas. Sci. Technol. 8 (1997) 1333-1338.), U.S. Pat. No. 8,650,660 and related family members, marketed as "Peak Force Tapping"), this provides a superior solution to gain optimization than does iterative optimization since the iterated methods invariably involve several measurement points that are non-optimized. Note that this does not preclude using this method and then further optimizing the imaging control parameters dynamically or iteratively. In some cases, it may be desirable to make a more conservative estimate of gain parameters for example and to then dynamically optimize the gains and/or other parameters.

The inventors have found that this method works excellently for both tapping mode imaging, where the cantilever is driven at or near its resonant frequency and jumping probe microscopy where the cantilever is driven or oscillated at a frequency below resonance.

This method also provides a substantial improvement over combined scanning methods. This includes two- or multi-pass methods that make use of stored data. An important example of height variation as a method of decoupling short and long range forces is the well-known double-pass or interleave mode ("lift" or "nap"), first pioneered by Hosaka et al S. Hosaka, A. Kikukawa, Y. Honda, H. Koyanagi and S. Tanaka, Jpn. J. Appl. Phys., 31, L904-907 1992). This was also commercialized and described in a US patent. In these dual or multipass modes, the first AFM point, line or full two-dimensional image scan is used to determine the position of the surface (measure the topography), i.e., the condition at which the measured signal, $R(h,V_0)=R_0$, where $R_0$ is a set-point value. The feedback signal, R, can be static deflection for contact mode AFM, oscillation amplitude for an amplitude-based detection signal, or frequency shift for frequency-tracking methods. The second scan is performed to determine interactions at a constant distance or bias condition to measure=$R(h+\delta V_1)$.

As a typical non-contact force example, MFM and EFM measurements can be made of the relatively long ranged and weak magnetic and/or electric forces. Here, once the position of the surface has been determined, force measurement at positive (=0-500 nm above the surface) separation yields magnetic (if probe is magnetized) or electrostatic (if probe is biased) force components. Some versions of these non-contact force measurement techniques may utilize a 'negative' separation, which occurs when the surface height and the force measurement are made with different cantilever oscillation amplitudes.

Short ranged elastic and viscoelastic forces can be measured by approaching closer to the surface (negative $\delta$, where $\delta$=the separation of height between the surface and the force measurement). In this case, the tip will penetrate further into the sample, thereby probing short ranged repulsive interactions. Similarly, by increasing the range of the tip excursion, both short and long ranged elastic and viscous (dissipative) interactions can be probed.

A recent application of this method to force measurements is described in Nanotechnology 22 (2011) 295704, the total article is hereby included in this application. In this implementation, the second pass is used to provide Jumping Probe or Force Curve-like information of the tip-sample interactions, using information about the sample topography measured from the first tapping mode pass. This method is greatly improved by optimizing the gain and scanning parameters as described here.

In some cases, there is more than one oscillation mode being used, especially for materials properties measurements. Examples are discussed at length in a U.S. Pat. No. 8,024,963 and family members by some of the inventors here. In some cases, there are additional feedback loops associated with operating for example, the second resonant mode of the cantilever in a phase-locked loop or other means of tracking the resonant frequency. There could also be gain control on the amplitude of the second mode used to keep it constant, improving the operation. The gains required to operate the microscope using these modes have formerly required user inputs and adjustments. By calibrating the stiffness and sensitivity of these modes, a curve similar to that shown in FIG. 2 can be generated and then used to automatically set these gains. This provides greatly improved ease of use and stability for these advanced imaging and measurement modes.

This method can be extended to operation in fluid environments. One method consists of first characterizing the spring constant in air. Then, when the cantilever is put into a fluid environment, the InvOLS can be deduced from the assumption that the spring constant as measured in the two environments is the same. By using the relationship $$k = \frac{k_B T}{InvOLS^2 \langle \Delta V^2 \rangle},$$

the InvOLS can be calculated as $$InvOLS = \sqrt{\frac{k_B T}{k \langle \Delta V^2 \rangle}}.$$

This is illustrated in FIG. 6, where the amplitude spectral densities of a single cantilever are shown in four different environments: in air far from a surface 7010, in air, close to a surface 7020, in water far from a surface 7030 and in water close to a surface 7040. In this particular case, the InvOLS was measured by doing a force curve on the surface and so represents a test of the above method.

In some cases it may be preferable to omit the step of measuring the spring constant in air and to calibrate cantilevers directly in liquids. With the advent of automated AFM protocols that optimize imaging parameters based on predictive algorithms, direct calibration of cantilever stiffness in different media has become a high priority. Pre-calibration of cantilevers in air is inconvenient for many experiments that require the injection of liquid as the first step of their protocol. Furthermore, calibrating a cantilever after it has made contact with a liquid may be highly inaccurate because the damping may change dramatically between air and liquid. Furthermore, contact with liquid causes irreversible changes to the damping properties to the cantilever once it is removed from the liquid due to surface contaminants that remain adhered to the cantilever even after it is dried. Therefore, it may be impossible to accurately calibrate a cantilever in air noninvasively after it has been exposed to liquid using Sader's calibration method.

In liquids, Sader's calibration methods break down because the Q factor of the cantilever is very difficult to measure accurately. In other words, the benefits of modeling the hydrodynamic viscous loading accurately are outweighed by the error in Q factor estimation. However the mass of the cantilever is overshadowed by the mass of the loading fluid when the cantilever is immersed in a liquid. This is evident from the fact that the resonance frequency of the cantilever drops by a factor of ~4× in water; i.e. the fluid mass is ~16× larger than the cantilever mass. In this hydrodynamic regime, the effective mass of the oscillator becomes a function of the density and viscosity of the fluid, and the plan view geometry of the cantilever. Importantly, because the fluid mass loading is a hydrodynamic quantity, it is independent of the cantilever thickness and its uncertainty. So, rather than modeling viscous loading and measuring the Q factor, as was done for calibration in air described previously, it is more accurate to simply model the inertial fluid mass loading directly when calibrating in liquids. After modeling the fluid mass loading $m_f$ and its frequency dependence $m_f \propto \omega^\beta$, all that remains is a measurement of the resonance frequency of the cantilever to calibrate the stiffness using the modified relationship $k=m_f \omega^2$. This method avoids introducing Q factor error into the stiffness estimation, as well as any error due to the cantilever thickness uncertainty.

Figure 7:
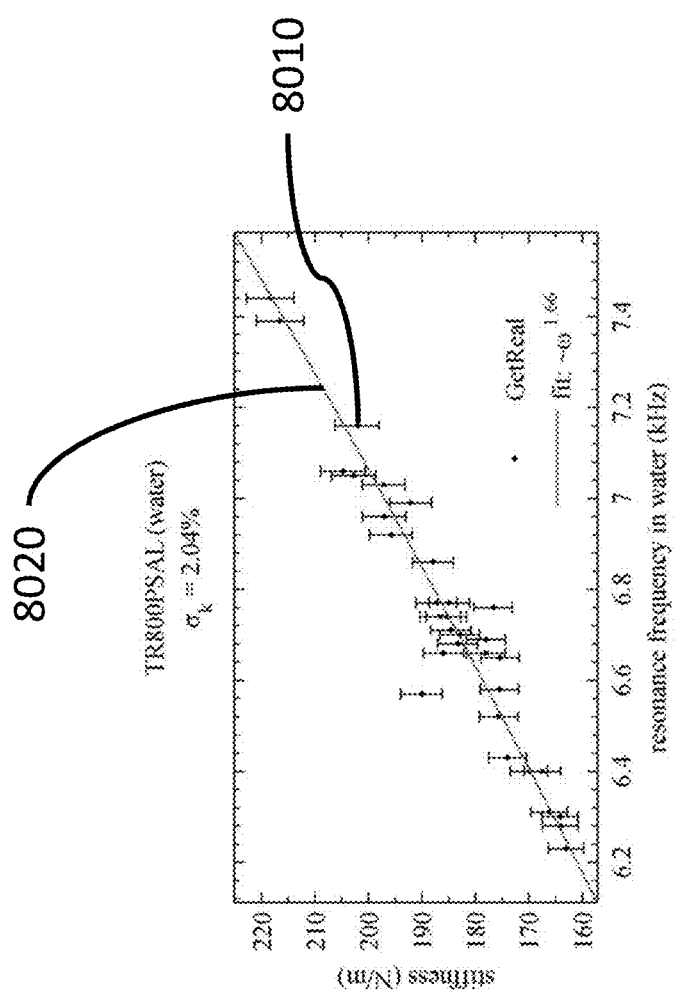
FIG. 7: The power law relationship between stiffness and resonance frequency of the cantilever is shown for a batch of cantilevers of the same model type.

To put this method into practice, it is necessary to empirically determine the hydrodynamic fluid mass loading function for a given cantilever shape by measuring the resonance frequency and stiffness of many such cantilevers. This allows the determination of the $\beta$ factor for a given cantilever type for a particular liquid, such as water. FIG. 7 shows empirical data 8010 of cantilever stiffness versus resonance frequency in water and the fit power law behavior 8020 for a specific cantilever model.

Once this hydrodynamic function is determined for a particular batch of cantilevers in a particular liquid (by the AFM manufacturer), and the resonance frequency is measured in the same liquid (by the experimenter), the stiffness of a single cantilever can be precisely calculated. Importantly, the measurement of the resonance frequency is very accurate down to Q factors as low as ~1, making this method very accurate for calibrating most cantilevers in water, and many other liquids.

In cases where the fluid mass loading $m_f$ is comparable to the cantilever mass $m_c$, it may be more accurate to model the frequency dependence of the total mass ($m_c+m_f$), where $m_c$ is the nominal mass of the cantilever in air. Although $m_c$ is prone to the errors caused by the unknown thickness of the lever, these errors may be negligible as long as $m_c$ is not larger than $m_f$. As an approximation, $m_c$ may be assumed constant for all cantilevers.

For calibration in either air or liquids, at least one test cantilever must be well calibrated using an independent method to obtain the true stiffness of the cantilever, and its corresponding resonance frequency and Q factor for calibration in air or its corresponding resonance frequency in liquid for calibration in that liquid. Such an independent calibration may be performed with an interferometric detection technique.

Since the optical sensitivity of an interferometer is determined by the interferometer design and the associated wavelength of light, it is substantially independent of the cantilever properties themselves. In other words, for a given cantilever motion, the optical beam deflection method will have a sensitivity (InvOLS) that will vary from lever to lever and system to system. Interferometers on the other hand, have a sensitivity that is based on the well-defined wavelength of the light used in the instrument. Because of this, many of the steps discussed above can be omitted and the optimized gains of the system can be determined a priori without resorting to the steps outlined above.

The interferometer used to determine the sensitivities and other properties can be used independently or in conjunction with a different cantilever detection method. An example of such an instrument is disclosed in the co-pending patent application and in the paper A. Labuda and R. Proksch, accepted APL, attached by reference to this application.

Preferred method:
With an atomic force microscope system operating to characterize a sample:
1. measuring the sensitivity of the detector monitoring the cantilever deflection;
2. Adjust the gain(s) of a feedback system that controls the tip-sample separation based on an error signal and that is controlled by at least one gain parameter;
3. Where we estimate one or more of the gain parameter(s) based on the measured sensitivity.

In tapping mode and related techniques, the error signal is the cantilever amplitude. Also, a common gain is the integral gain parameter. It is also preferable to measure the sensitivity (and additionally the spring constant without making contact between the tip and the sample. This can be accomplished by
1. estimating the spring constant of the cantilever with one method that depends on the detection sensitivity;
2. estimating the spring constant with a second method; estimating the sensitivity of the cantilever detection by inverting the first method using the spring constant estimation from the second method.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, Or some specific purpose computer such as a workstation. The computer may also be a handheld computer, such as a PDA, tablet, cellphone, or laptop.

The programs may be written in C, or Java, Python, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of operating a cantilever based measuring instrument, comprising:
obtaining a relationship between an optical lever sensitivity of a cantilever of the cantilever based instrument in a dynamic environment where the sensitivity depends on distances to a sample, and using said relationship to determine a dynamic optical lever sensitivity called invOLS of said cantilever; and
measuring surfaces of the surface being measured using said invOLS value, by using a tip of the cantilever to measure characteristics of the surface and by estimating parameters of gain in the measurement, based on the invOLS value.

2. The method as in claim 1, wherein said obtaining said invOLS value comprises measuring a sensitivity of the cantilever of the cantilever based measuring instrument.

3. The method as in claim 2, wherein said obtaining said invOLS value comprises measuring the sensitivity without making contact between a tip of the cantilever and the sample.

4. The method as in claim 3, wherein said obtaining a relationship comprises obtaining a frequency spectrum of Brownian movement, and using said frequency spectrum to determine said sensitivity.

5. The method as in claim 3, wherein the sensitivity is measured by estimating a first spring constant of the cantilever using one technique that depends on detection sensitivity and estimating a second spring constant with a second technique different than the first technique, and estimating a sensitivity of the cantilever detection by inverting the first spring constant against the second spring constant.

6. The method as in claim 1, further comprising determining a spring constant of the cantilever.

7. The method as in claim 1, wherein said measuring comprises adjusting a gain of the feedback system that controls a separation between a tip and the sample based on an error signal, that is based on at least one gain parameter that is estimated from the measured sensitivity.

8. The method as in claim 1, wherein said cantilever based instrument is an Atomic Force Microscope.

9. A cantilever based measuring instrument apparatus, comprising:
a cantilever based instrument that has a cantilever, operating to measure a surface, a controller that controls measuring information about the cantilever, in a dynamic environment where the sensitivity depends on distances to a sample, and using said relationship to determine a dynamic optical lever sensitivity called invOLS of said cantilever; and said cantilever based instrument operating for measuring surfaces of the surface being measured using said invOLS value, by using a tip of the cantilever to measure characteristics of the surface and by estimating parameters of gain in the measurement, based on the invOLS value.

10. The apparatus as in claim 9, wherein said obtaining said invOLS value comprises measuring a sensitivity of the cantilever of the cantilever based measuring instrument.

11. The apparatus as in claim 10, wherein said obtaining said invOLS value comprises measuring the sensitivity without making contact between a tip of the cantilever and the sample.

12. The apparatus as in claim 11, wherein said obtaining a relationship comprises obtaining a frequency spectrum of Brownian movement, and using said frequency spectrum to determine said sensitivity.

13. The apparatus as in claim 11, wherein the sensitivity is measured by estimating a first spring constant of the cantilever using one technique that depends on detection sensitivity and estimating a second spring constant with a second technique different than the first technique, and estimating a sensitivity of the cantilever detection by inverting the first spring constant against the second spring constant.

14. The apparatus as in claim 9, further comprising determining a spring constant of the cantilever.

15. The apparatus as in claim 9, wherein said measuring comprises adjusting a gain of the feedback system that controls a separation between a tip and the sample based on an error signal, that is based on at least one gain parameter that is estimated from the measured sensitivity.

16. The apparatus as in claim 9, wherein said cantilever based instrument is an Atomic Force Microscope.

17. A method of operating a cantilever based measuring instrument, comprising:

obtaining a first relationship between an optical lever sensitivity of a cantilever of the cantilever based instrument in a first environment to determine a parameter of said cantilever in said first environment;

obtaining a second relationship between an optical lever sensitivity of a cantilever of the cantilever based instrument in a second environment to determine a parameter of said cantilever in said second environment; and determining an optical lever sensitivity InvOLS for the cantilever, based on the spring constants in both environments being the same as $$InvOLS = \sqrt{\frac{k_B T}{k \langle \Delta V^2 \rangle}}.$$

18. The method as in claim 17, wherein the first environment is in gas, and the second environment is in water.

* * * * *